United States Statutory Invention Registration [19]

[11] Reg. Number: H603

Avery et al.

[43] Published: Mar. 7, 1989

[54] METHODS OF MAKING AND USING ADHESIVE RESINS AND GLUE MIXES

[75] Inventors: Larry P. Avery; William A. Bomball; Raymond L. Drury, Jr.; Larson B. Dunn, Jr., all of Decatur; Milton C. Kintzley, Mt. Zion; Barbara J. Hipple, Decatur, all of Ill.

[73] Assignee: A. E. Staley Manufacturing Company, Decatur, Ill.

[21] Appl. No.: 128,856

[22] Filed: Dec. 4, 1987

[51] Int. Cl.[4] ..... C08J 9/16; C08J 9/22

[52] U.S. Cl. ..... 524/56; 524/58

[58] Field of Search ..... 524/17, 56, 57, 58

[56] References Cited

U.S. PATENT DOCUMENTS 3,213,045 10/1965 Klein et al. ..... 428/529
4,419,400 12/1983 Hindersinn ..... 524/762

FOREIGN PATENT DOCUMENTS 1090026 11/1980 Canada .
1113640 5/1986 Japan ..... 524/58

OTHER PUBLICATIONS

Kirk-Othmer, Encyclopedia of Chemical Technology, vol . 14, pp. 5–17 (3d ed., John Wiley & Sons, 1981).
A. H. Conner et al., "Carbohydrate Modified Phenol--Formaldehyde Resins", Journal of Wood Chemistry and Technology (Nov. 1985).
A. W. Christiansen, "Durable Wood Adhesives Based on Carbohydrates" For. Prod. J. 1986 36 (7–8), 20–8, abstracted at C.A. 105:228845b.
C. D. Chang et al., "Sucrose-Modified Phenolic Resin as Plywood Adhesives", Adhesives Ages, Jul., 1962, pp. 36–40.
T. Sellers, Plywood and Adhesive Technology (Marcel Dekker, Inc. 1985), Chapters 10, 15, 18, 19, and 20.

*Primary Examiner*—John F. Terapane
*Assistant Examiner*—J. E. Thomas

[57] ABSTRACT

A method of providing an adhesive resin and methods of providing glue mixes useful in plywood manufacture are provided. Also provided is a method of manufacturing plywood. An alkyl glycoside, e.g. methyl glucoside, is utilized in various ways in the manufacture of an adhesive resin, a glue mix and/or, a plywood panel to contribute various properties thereto. The plywood panel is useful as a structural material in a variety of settings.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHODS OF MAKING AND USING ADHESIVE RESINS AND GLUE MIXES

FIELD OF THE INVENTION

This invention relates to methods of making and using adhesive resins and glue mixes, particularly for use in bonding wood to make structural panels.

BACKGROUND OF THE INVENTION

The use of wood and glue to make plywood dates back to the ancient Egyptians (Circa 1500 B.C.). A cedar wood casket found in the tomb of King Tut-Ankh-Amon has ebony veneer with ivory inlay.

In modern times, hardwood and softwood laminate panels have become common and popular structural materials. The softwood plywoods are generally used where strength, stiffness, and construction convenience are more important than appearance while hardwood plywoods are generally used where appearance is more important than strength.

Plywood is made by adhering multiple wood veneers with the grain of at least one veneer at an angle to the grain of another. Other types of structural composites are made by binding chips, flakes or particles of wood into boards or panels.

The adhesives used to bond veneers or bind pieces of wood have evolved from solely plant or animal origin (e.g., hide, bone, blood, casein, soybean and vegetable) to synthetic resins such as urea-formaldehyde (UF) and phenol-formaldehyde (PF). Modern glue mixes for plywood generally include a phenol-formaldehyde resin along with various extenders (e.g. proteinaceous and/or amylaceous materials) and/or fillers, (e.g. cellulosic and/or lignocellulosic materials).

A variety of additives or modifiers for phenol-formaldehyde resins have been proposed. Carbohydrates, particularly those derived from hydrolysis of wood, were proposed and evaluated as modifiers of PF resins for plywood by A. H. Conner et al., "Carbohydrate Modified Phenol-Formaldehyde Resins" *Journal of Wood Chemistry and Technology* (November 1985). This article discloses that carbohydrates having free reducing groups, e.g. xylose, were unsuitable, but that methyl xyloside and methyl glucoside yielded resins having acceptable bond strengths when used in crude formulation and application methods.

SUMMARY OF THE INVENTION

This invention relates to a method of providing an adhesive resin comprising:

(a) reacting a mixture comprising a phenolic compound and an aldehyde under alkaline conditions in the presence of an alkyl glycoside, and (b) transporting said mixture by means of the flow of said mixture through a conduit.

It has been found that the presence of an alkyl glycoside allows for the advancement of a PF resin to a higher molecular weight with surprisingly acceptable viscosity, storage life and, when used in a glue mix, dry-out resistance. When the resin is used in a plywood glue mix, it gives improved pre-press adhesion along with shorter cure times.

This invention also relates to a method of preparing an adhesive mixture useful as a plywood glue mix by mixing an extender and a resol resin under conditions which increase the viscosity of the mixture over time of mixing to a spreadable viscosity, the improvement comprising further increasing the viscosity of the mixture to a higher viscosity and adding an alkyl glycoside to the mixture. The alkyl glycoside can be added either before or after the step of further increasing the viscosity of the mixture. Such steps include adding more extenders, more caustic to better paste the extenders, higher mix temperatures and/or longer mixing times to better hydrate the extenders and the like.

This invention also relates to a method of formulating an adhesive mixture comprising:

(a) charging a mixing vessel with an extender, an alkyl glycoside, and a first amount of an aqueous resol resin sufficient to fluidize said mixture, (b) mixing said fluidized mixture to obtain a macroscopically homogeneous mixture, (c) adding caustic and a second amount of said aqueous resol resin to said homogeneous mixture, and mixing the resulting mixture.

This invention also relates to a method of forming plywood by formulating a glue mix with a resol resin and spreading said glue mix on the planar surface of a first wood veneer in an amount per unit of said surface sufficient to adhere said veneer to a second wood veneer, the improvement comprising incorporating an alkyl glycoside in said glue mix and reducing the amount of glue mix spread per unit of said surface.

It has been found that the addition of an alkyl glycoside to a glue mix allows for a significant reduction in the amount of glue spread per unit area of veneer without loss of strength in the bond of the veneer to a second veneer. This allows for a significant conservation of resources, particularly the phenol used in a resol resin, which phenol is typically derived from petroleum. The addition of an alkyl glycoside has also been found to improve the flow properties of the glue mix which allows for a more nearly uniform spray pattern or curtain coating.

DETAILED DESCRIPTION OF THE INVENTION

The following detailed description will deal in turn with resin manufacture and handling, glue mix manufacture, and plywood manufacture.

I. Resin Manufacture and Handling

The resins made by and useful in the present invention are comprised of three major components, i.e. a phenolic compound, an aldehyde and caustic, as well as a variety of optional additives.

By "a phenolic compound" is meant a composition comprised predominantly of a compound of the formula:

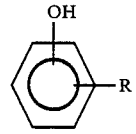

wherein R is a substituent selected from the group of lower alkyl ($C_1$–$C_4$), lower alkoxy ($C_1$–$C_4$), halogen (e.g., Cl or Br), hydroxy and hydrogen. The preferred phenolic compound is phenol itself, but suitable compounds, particularly in admixture with phenol, include cresol, chlorophenol, bromophenol, resorcinol and the like. No particular grade or purity of phenolic compound is critical to the invention.

The resin is also comprised of an aldehyde. The aldehyde selected is typically formaldehyde (in any of its commercial forms including, for example, paraformaldehyde or a 50% aqueous solution of formaldehyde) furfural, or formaldehyde and furfural jointly. Other lower aldehdyes, e.g. acetaldehyde, propionaldehyde or butyraldehyde, can be substituted, at least in part, but no particular advantage of such is contemplated.

The third major component of the resin is caustic. By "caustic" is meant any material of a sufficiently alkaline nature to promote the formation of the resin. Typically sodium hydroxide will be used but the oxides and hydroxides of other alkali or alkaline earth materials will be useful.

Phenolic resins produced from a molar excess of formaldehyde under alkaline conditions are commonly referred to as resols. Resols used for plywood gluing generally have a formaldehyde/phenol ratio of 1.6/1 to 2.5/1, typically 1.8/1 to 2.2/1. Resols at low F/P ratios have relatively linear structure whereas resols prepared at high F/P ratios have a highly branched structure. The level of alkali can be varied according to the particular desired properties. Alkali also solubilizes the resin in addition to catalyzing the reaction. The mole ratio of sodium hydroxide to phenol generally ranges from about 0.2 to 0.7 with 0.2 to 0.4 most common for particle board resins and 0.4 to 0.6 typically used for plywood resins. The resins are typically formulated at about 40% to 60% resin solids, the remainder being water.

In the method of this invention of preparing a resin, the reaction between the phenolic compound and aldehyde take place in the presence of an alkyl glycoside. By "alkyl glycoside" is meant a composition comprised predominantly of an acetal or ketal of a saccharide with an alcohol. Preferred alkyl glycosides are lower alkyl glycosides wherein the alkyl group has from one to four carbon atoms. Typical saccharides from which the glycoside is derived include glucose, fructose, mannose, galactose, talose, gulose, allose, altrose, idose, arabinose, xylose, lyxose and ribose. The preferred glycosides are glucosides due to the ready availability of glucose as a starting material.

The amount of the alkyl glycoside added to the resin formulation will be a minor amount, typically from about 5% to about 20% by weight of resin solids. The alkyl glycoside can be used as an additive or to replace from about 5% to about 20% by weight of phenol and thus allow the use of higher F/P ratios (e.g. about 2.4 to about 2.7) than normally used for plywood glue resins.

The resins are prepared by the method of this invention by combining the above components and heating at elevated temperatures below the boiling point of the mixture. Because the reaction is typically exothermic, the reaction kettle should be fitted with cooling capacity as well as heating capacity. The reactants may all be charged initially (single caustic charge) or a portion of the caustic can be reserved for later charge (double caustic charge). The resin reaction proceeds through three commonly recognized stages. In the A-stage, the resol has a low molecular weight (less than 200) and is soluble in organic solvents such as lower alcohols and ketones. When a resol is heated further, it enters a B-stage where the resin is insoluble but is swollen by solvents and becomes softened on heating. The B-stage resins, commonly called resitols, are an intermediate stage and it is among this wide molecular spectrum that most plywood glue resins are formulated. On further heating, the resitol is further crosslinked to the resite or C-stage wherein the resin is practically infusible and insoluble.

It has been found that the alkyl glycoside generally does not appear (by Carbon-13 NMR) to react into the resin under the usual reaction conditions employed to make the resin. However, the presence of an alkyl glycoside does appear to slightly increase the rate of methylolation of phenol and to decrease the rate of methylene bridge formation. This allows for the advancement of the resin to a greater degree and thus improve prepress adhesion, without the formation of an undesirable number of crosslinks prior to final curing of the resin. In fact, the double caustic charge procedure which is commonly used to advance a resin and improve prepress but which is more complicated, may not be necessary when an alkyl glycoside is present in the reaction mixture. The resin can be "cooked" to yield good prepress but still have a pumpable viscosity (e.g. less than about 2000 mPa·s) for a period of weeks.

A variety of additives can be added to the resin after resin formation and prior to glue formation. Examples of such additives include antifoaming agents, starches, methanol, tackifiers, urea surfactants, cellulose ethers and the like.

To be of practical utility, the resin must be sufficiently cured to have adhesive utility (both prepress adhesion and curability) and yet be sufficiently flowable to allow transport and storage as a fluid. To transport the resin efficiently through a conduit, the resin should be pumpable for a period of weeks. Pumpability typically requires a viscosity of less than about 2000 mPa·s at 25° C. Typical viscosities range from about 500 to about 1100 mPa·s at 25° C.

While the remainder of the following will be devoted largely to plywood glue uses of the resin, the resin should also be useful as a binding or bonding agent for other wood products, for example, as a binder resin for particle board, flakeboard, oriented strand board and the like.

II. Glue Mix Manufacture

While synthetic resins have become generally indispensable in the adhesives used for the commercial production of structural wood panels, glue mixes are generally also comprised of a number of other components. Extenders are components which have some inherent adhesive characteristics of their own and thus can be considered supplemental adhesives in the glue mix. Fillers are components which, on the other hand, are not significantly adhesive, but which improve the mix's working properties, performance, strength or the like.

The extenders used in glue mixes can be generally categorized as glutinous or non-glutinous. Examples of glutinous extenders are wheat flours (e.g. soft red winter, western white, hard red winter or spring and durum) and starches (e.g. potato, corn and tapioca). Examples of nonglutinous extenders are dried animal blood (beef, hog, sheep) and cereal flours such as corn, rye, sorghum, soya, chemically modified wheat and chemically modified corn. Extender can generally be used at a level of up to about 40% of resin solids, but softwood plywood glue typically contains only about 20% to 25% extenders by weight of resins solids.

The fillers used in glue mixes typically act to fill holes and irregularities in veneer and to retain adhesive on the glueline. Fillers can generally be categorized as lignocellulosic or inorganic. Examples of lignocellulosic fillers include furfural digestion residue (residue from furfural digestion of the hulls of corn, oat and/or rice grains or oak wood chips), nutshell flours (e.g. walnut and pecan), tree bark flours (e.g. hemlock, red cedar, Douglas fir, alder, Southern Pine), wood flours (e.g. particle board sander dust) and lignin from paper pulp processing. Examples of inorganic fillers include clays such as attapulgite and bertonite.

The particle size of the filler should, of course, be consistent with the mode of application of the glue mix, i.e. the filler should be able to pass the particular orifice through which the glue is intended to pass. The amount of filler will generally depend on the degree of irregularity of the veneer for which the glue mix is intended, but will typically range between about 5% and about 15% by weight of resin solids.

The method of this invention of formulating a glue mix comprises first mixing an extender, an alkyl glycoside and a first amount of an aqueous resol resin sufficient to fluidize the resulting mixture. The mixture will commonly exotherm as the extender and alkyl glycoside hydrate and the resin of the glue mix will be partially advanced. The remainder of the resol resin is then added with further mixing, optionally in further increments with mixing and/or glue mix advancement between increments.

This method allows the use of alkyl glycoside in the glue mix without adversely affecting the application viscosity of the mix and facilitates the dispersion of the extender in the resin.

III. Plywood Manufacture

The glue mix can be applied to wood veneer to bond multiple plies and thus manufacture plywood. The manufacture of plywood is succinctly described in Kirk-Othmer, *Encyclopedia of Chemical Technology,* vol. 14, pp. 5–17 (3d ed., John Wiley & Sons, 1981), the disclosure of which is incorporated hereby reference.

In plywood manufacture, veneer is cut from a log, generally by rotating a log against knife edge running the length of the log. The veneer is cut into panels, sorted and dried. The dried panels are clipped and spliced to make full size sheets for gluing.

In gluing, a panel is typically coated with glue on both sides and a face and back panel are assembled with their respective grains at an angle (generally perpendicular) to the grain of the coated panel. The ply arrangement is then inserted in a steam-heated press and pressed at over 100° C. (e.g. 113°–143° C.) to achieve compaction and nominal (about 4%) compression. The heat causes the resin of the glue mix to set to a resite or C-stage. Extraction studies and solid state NMR indicate that much (e.g. at least 50% by weight) of the alkyl glycoside reacts into the resin during curing thereof. The cured panels are then ready for sorting, grading and any desired post-treating (e.g. impregnation for dimensional stability, decoration, fire or decay resistance, greater hardness and the like).

The glue spread level used to manufacture a particular batch of plywood will depend upon a variety of factors including veneer temperature, veneer moisture content, assembly conditions, assembly times, climatic conditions and the like. The choice of glue spread level is within the skill of the art for a given set of conditions. The addition of an alkyl glycoside will, however, generally allow the use of a significantly lower (e.g. about 10% to 15%) glue spread level than if the alkyl glycoside were omitted from the formulation.

The glue mix can be applied to the wood veneer by a variety of methods. While roll coating (use of grooved applicator rolls) was probably the earliest mechanized application method used, spray coating, curtain coating and extrusion applicators have become common. The addition of alkyl glycoside improves the flow properties of the glue mix and thus facilitates even application, particularly in more nearly uniform spray coating patterns and in reducing blips in curtain coatings.

Softwood plywood can be put to a variety of structural and construction uses, the most common being subflooring, decking and siding in light frame construction. Hardwood plywood is often used for decorative purposes on a variety of structural objects including building, appliances, furniture and the like.

EXAMPLES

Glue Mix Formulation

A series of glue mixes containing methyl glucoside were made and evaluated against a control.

CONTROL A

A stirred mixing vessel was charged with:

| INGREDIENT | PARTS BY WEIGHT |
|---|---|
| Water (@ 100° F.) | 365 |
| PF Resin (@ 41% d.s.) | 200 |
| Filler (Cob-X TM from Del Bates Co., Orange, TX) | 150 |
| Wheat Flour | 100 |

The above initial charge was stirred for 3 minutes whereupon 300 parts by weight additional resin and 65 parts by weight of 50% aqueous sodium hydroxide were added. The resulting mixture exothermed and was stirred for 15 minutes whereupon another 1000 parts by weight additional resin was slowly added. The viscosity at 5 minutes after final resin addition was 700 cps at 82° F. and the viscosity at 60 minutes was 1250 cps at 80° F. with respective gel times of 30.4 min and 30.6 min. The resulting glue mix exhibited foam which indicated poor curtain coating properties.

EXAMPLE 1

A stirred mixing vessel was charged with:

| INGREDIENT | PARTS BY WEIGHT |
|---|---|
| Water (@ 100° F.) | 365 |
| Methyl Glucoside (Sta-Meg TM 104 available from A. E. Staley Mfg. Co. diluted to 41% solids) | 225 |
| Filler (Cob-X TM) | 150 |
| Wheat Flour | 160 |

The resulting mixture was stirred for 3 minutes whereupon 250 parts by weight of PF resin (41% solids) and 65 parts by weight 50% aqueous sodium hydroxide were added. The resulting mixture exothermed and was stirred for 15 minutes whereupon 1045 parts of additional resin were added. The viscosity at 5 minutes after final resin addition was 4850 cps at 89° F. and after 60 minutes was 5800 cps at 81° F. with gel times of 49.9 and 49.4, respectively. The resin had a pH of 10.72 and exhibited no foaming.

EXAMPLE 2

To reduce the gel times of Example 1, more extenders and longer mixing times were employed as follows. A stirred mixing vessel was charged with:

| INGREDIENT | PARTS BY WEIGHT |
|---|---|
| Water (0.100° F.) | 365 |
| Methyl Glucoside (Sta-Meg TM 104) | 225 |
| Filler (Cob-X TM) | 175 |
| Wheat Flour | 185 |

The resulting mixture was stirred for 7 minutes whereupon 300 parts by weight PF resin and 65 parts by weight 50% aqueous sodium hydroxide were added. The resulting mixture exothermed and was stirred for 20–25 minutes whereupon an additional 975 parts by weight of resin were added slowly. The viscosity at 5 minutes after final resin addition was 4800 cps at 90° F. and at 60 minutes was 5300 cps at 83° F. with a gel time of 36.5 minutes.

EXAMPLE 3

To increase final glue temperature to closer to normal commercial practice, the mixing vessel was fitted with a heating jacket. A stirred and jacketed mixing vessel was charged with:

| INGREDIENTS | PARTS BY WEIGHT |
|---|---|
| Water | 365 |
| Methyl Glucoside (Sta-Meg TM 104) | 225 |
| Filler (Cob-X TM) | 200 |
| Wheat Flour | 185 |

The resulting mixture was stirred for 7 minutes whereupon 400 parts by weight of PF resin and 65 parts by weight of 50% aqueous sodium hydroxide were added. The resulting mixture exothermed (up to 145° F. and) was stirred for 20–25 minutes whereupon an additional 875 parts by weight resin was added slowly. The viscosity at 5 minutes after final resin addition was 4500 cps at 102° F. and at 60 minutes was 5300 cps at 90° F. with gel times of 35.0 and 35.1, respectively.

EXAMPLE 4

The use of methyl glucoside as an extender was evaluated against a control and a formulation using water in place of the methyl glucoside. Three separate glue mixes were made in a stirred vessel as follows:

| | CONTROL B | EXAMPLE 4 | COMPARATIVE A |
|---|---|---|---|
| Water | 81.3 | 81.3 | 81.3 |
| Filler (Cob-X TM) | 25.0 | 25.0 | 25.0 |
| Wheat Flour | 25.0 | 25.0 | 25.0 |
| Mixed 5 min | | | |
| PF Resin (46% d.s.) | 116.0 | 116.0 | 116.0 |
| Caustic (50% NaOH) | 10.8 | 10.8 | 10.8 |
| Mixed 8 min | | | |
| Methyl Glucoside (Sta-Meg TM 100 at 46% ds) | — | 31.0 | — |
| Water | — | — | 31.0 |
| Mixed 2 min | | | |
| Resin | 90.1 | 90.1 | 90.1 |

Plywood panels (8″×8″) were made with these glue mixes under these conditions:

5 and 6 gram spread levels (equal to 25–30 lbs/1000 linear board ft)
5 min stand time
5 min pre-press @200 psi
4.5 min hot-press @300 psi and 320° F.
20, 60, and 75 min total assembly times.

After a 60 min vacuum-pressure water soak test, wood failure results were as follows:

| | WOOD FAILURE, % | | |
|---|---|---|---|
| GLUE MIX | ASSEMBLY TIME (MIN) | SPREAD LEVEL (9) 6 GRAM | SPREAD (9) 5 GRAM |
| Control B | 20 | 92 | 67 |
| Control B | 60 | 93 | 65 |
| Control B | 75 | — | 83 |
| Example 4 | 20 | 93 | 76 |
| Example 4 | 60 | 90 | 78 |
| Example 4 | 75 | — | 77 |
| Comp. A | 20 | 83 | 81 |
| Comp. A | 60 | 90 | 57 |

At 5 gram spread levels the methyl glucoside mix gives higher wood failure results than the control mix at 20 and 60 minute assembly times. At the 75 minute assembly time wood failure results showed no statistically significant difference. The methyl glucoside mix, at the 60 minute assembly time, showed better dry-out resistance than the control mix.

At 5 gram spread levels the methyl glucoside has much better dry-out resistance than the water mix at the 60 minute assembly time.

EXAMPLE 5

The following example illustrates a laboratory scale preparation of a control resol resin and one prepared with methyl glucoside. The following ingredients were mixed: 10 grams solid phenol, 1.7 grams solid sodium hydroxide, 21.56 grams of 37% formalin (containing methanol useful as an internal standard for NMR) and sufficient deuteration water ($D_2O$) to provide a mixture having 55.8% solids. The molar ratio of formaldehyde/phenol/caustic was 2.5/1/0.4. A sample of the mixture was placed in an NMR tube and heated first at 69.8° C. for 3 hours and then 85° C. for 1 hour. The progress of the reaction was followed using $C^{13}$ NMR.

An experimental resin was prepared as above but 8 grams of solid methyl glucoside was added along with additional water to obtain a 55.6% solids mixture.

The progress of the reaction was followed with $C^{13}$ NMR which indicated that the rate of methylolation of the experimental resin was increased as compared with the control and the rate of methylene bridge formation was decreased compared with the control.

What is claimed is:

1. A method of providing an adhesive resin comprising:

(a) reacting a mixture comprising a phenolic compound and an aldehyde under alkaline conditions in the presence of an alkyl glycoside, and (b) transporting said mixture by means of the flow of said mixture through a conduit.

2. A method of claim 1 wherein said alkyl glycoside is a lower alkyl glucoside.

3. A method of claim 1 wherein said alkyl glycoside is methyl glucoside.

4. A method of claim 1 wherein said phenolic compound is phenol and said aldehyde is formaldehyde.

5. A method of claim 1 wherein said mixture is reacted to a viscosity of less than about 2000 mPa·s.

6. A method of claim 1 wherein said transporting comprises pumping said mixture.

7. In a method of preparing an adhesive mixture useful as a plywood glue mix by mixing an extender and a resol resin under conditions which increase the viscosity of the mixture over time of mixing to a spreadable viscosity, the improvement comprising further increasing the viscosity of the mixture to a higher viscosity and adding an alkyl glycoside to the mixture.

8. A method of claim 7 further comprising premixing said alkyl glycoside with said extender.

9. A method of formulating an adhesive mixture comprising:

(a) charging a mixing vessel with an extender, an alkyl glycoside, and a first amount of an aqueous resol resin sufficient to fluidize said mixture, (b) mixing said fluidized mixture to obtain a macroscopically homogeneous mixture, (c) adding caustic and a second amount of said aqueous resol resin to said homogeneous mixture, and mixing the resulting mixture.

10. In a method of forming plywood by formulating a glue mix with a resol resin and spreading said glue mix on the planar surface of a first wood veneer in an amount per unit of said surface sufficient to adhere said veneer to a second wood veneer, the improvement comprising incorporating an alkyl glycoside in said glue mix and reducing the amount of glue mix spread per unit of said surface.

* * * * *